United States Patent
Toyohara et al.

(10) Patent No.: US 6,368,210 B1
(45) Date of Patent: Apr. 9, 2002

(54) VIDEO GAME DEVICE, PLAY CONTROL METHOD FOR VIDEO GAME, AND READABLE RECORDING MEDIUM RECORDING THE METHOD

(75) Inventors: Koji Toyohara; Hiroshi Tanibuchi, both of Nishinomiya; Tetsuro Eguchi, Kobe; Koji Maeda, Sakai; Shigenori Kiwata, Osaka, all of (JP)

(73) Assignee: Kabushiki Kaisha Konami Computer Entertainment Osaka, Osaka-fu (JP)

( * ) Notice: Subject to any disclaimer, the term of this patent is extended or adjusted under 35 U.S.C. 154(b) by 0 days.

(21) Appl. No.: 09/453,482

(22) Filed: Dec. 9, 1999

(30) Foreign Application Priority Data

Dec. 11, 1998 (JP) .......................... 10-375089

(51) Int. Cl.$^7$ ................................ A63F 9/24
(52) U.S. Cl. ............................ 463/3; 463/43
(58) Field of Search ................ 463/1, 4, 8, 3, 463/31, 35, 43, 44

(56) References Cited

U.S. PATENT DOCUMENTS 5,435,554 A * 7/1995 Lipson ...................... 273/88
5,639,084 A * 6/1997 Kawasaki .................. 473/421
6,183,363 B1 * 2/2001 Ishihara et al. ............ 463/31

FOREIGN PATENT DOCUMENTS

| JP | 9-99174 | 4/1997 |
| JP | 9-299612 | 11/1997 |
| JP | 10-52572 | 2/1998 |
| JP | 10-71274 | 3/1998 |

OTHER PUBLICATIONS

The Magazine "JUGEMU", Edition of Aug. 1998, p. 178 ("Live Broadcast Powerful Pro–Baseball '98 Opening Edition") RECRUIT Inc., Published on Aug. 1, 1998.

The Magazine "JUGEMU", Edition of Jun. 1998, pp. 11 to 13 (Live Broadcast Powerful Pro–Baseball 5) RECRUIT Inc., Published on Oct. 6, 1998.

* cited by examiner

Primary Examiner—Joe H. Cheng
Assistant Examiner—Kim T. Nguyen
(74) Attorney, Agent, or Firm—Jordan and Hamburg LLP

(57) ABSTRACT

A video game device includes a batting instructing input device for instructing a play character which is a batter in a baseball game with batting contents, a batting judging means for judging the batting contents based on the batting instruction contents and the instruction results of the action contents, a batting storing means for storing the batting judgment contents, and a batting record display means for reading the batting judgment contents from the batting storing means and displaying on the image display device, so that the batting record of a batter, and in particular the batting habits of the batter, can be readily known in the event that the game player is a baseball batter as a play character on the screen.

31 Claims, 11 Drawing Sheets

FIG. 8

| | STARTING ORDER | | | ON THE BENCH | |
|---|---|---|---|---|---|
| | EAST TEAM 1P | | PITCHER | | |
| 1 | IIDA | ☺ | CENTER-FIELD | AOYAGI | ☹ |
| 2 | MANAKA | ☺ | RIGHT-FIELD | MIKI | ☹ |
| 3 | IKEYAMA | ☺ | THIRD | FUKUSHIMA | ☺ |
| 4 | FURUTA | ☺ | CATCHER | TSUJI | ☺ |
| 5 | WATARAI | ☺ | FIRST | SHIROISHI | ☺ |
| 6 | DOBASHI | ☺ | SECOND | KOBAYAKAWA | ☺ |
| 7 | INABA | ☺ | LEFT-FIELD | BABA | ☺ |
| 8 | MIYAMOTO | ☺ | SHORT-STOP | SATO | ☺ |
| 9 | WATANABE | ☺ | PITCHER | | |

ON THE FARM
IWAMURA ☺
KATSUNORI ☺

FUKUSHIMA
BATTING D — THROWS RIGHT, BATS LEFT
POWER C — FIELDS OUTFIELD, THIRD
RUNNING C — BATTING AVE. .000
THROWING C — HOMERUNS 0
FIELDING B — R.B.I. 0

INABA
BATTING C — THROWS LEFT, BATS LEFT
POWER D — FIELDS OUTFIELD, FIRST
RUNNING B — BATTING AVE. .000
THROWING B — HOMERUNS 0
FIELDING B — R.B.I. 0

VIDEO GAME DEVICE, PLAY CONTROL METHOD FOR VIDEO GAME, AND READABLE RECORDING MEDIUM RECORDING THE METHOD

BACKGROUND OF THE INVENTION

The present invention relates to a video game device wherein a play character on a video screen is caused to perform a simulation experience (role-playing) in place of the actual player, a play control method for the video game, and a readable recording medium storing the method.

Conventionally, role-playing games wherein a player performs a simulation experience as a play character on the video screen are known wherein in the event that the play character is a pitcher in a baseball game, scenes wherein a play record of that baseball pitcher is displayed. The game player has been able to tell his/her own habits at the time of pitching, from this play record.

However, in the event that the play character is a batter in a baseball game, a play record thereof could not be known. On the other hand, various factors that differ from pitching figures are related to batting figures of batters, particularly the batting habits of the batters, and there have been requests to be able to know the records in detail.

SUMMARY OF THE INVENTION

The present invention has been made in light of the above, and it is an object thereof to provide a video game device, a play control method for the video game, and a readable recording medium storing the method, capable of easily obtaining batting records in the event that the game player is a baseball batter as a play character on the screen.

According to a first aspect, the present invention is configured as a video game device, comprising:

a display device for displaying play characters and the action contents thereof, and for displaying menus corresponding to various actions of the play characters;

an operating unit capable of selectively effecting a menu selection regarding arbitrary actions from the various menus;

an action storing means for storing the action contents of the play character in a manner corresponding to the operation contents at the operating unit; and an action control means for reading from the action storing means the action contents according to the instructions from the operating unit, and causing the play character to perform the same;

the video game device comprising:

a batting instructing means for instructing the play character which is a batter in a baseball game of batting instruction contents;

a batting judging means for judging the batting contents based on the batting instruction contents and the instruction results of the action contents;

a batting storing means for storing the batting judgment contents; and a batting record display means for reading the batting judgment contents from the batting storing means and displaying on the display device.

According to this configuration, multiple menus are displayed on a video screen, and the operating unit selects and instructs a desired menu from these. As a result, action contents corresponding to the menu selected and instructed are executed. In the event that a play character, which is a batter in a baseball game, is instructed of batting contents by a batting instructing means, the batting contents are judged based on the batting instruction contents and the instruction results of the action contents, the batting judgment contents are stored in a batting storing means, and the batting judgment contents are read from the batting storing means and displayed on the display device. Thus, the player can cause the baseball batter as a play character on the screen to perform a simulation experience in a manner closer to a real play, so the game has a sense of reality, is absorbingly interesting, and the habits of the player can easily be known from the batting record thereof.

BRIEF DESCRIPTION OF THE DRAWINGS

FIG. 8 is a diagram illustrating a screen of the video game;

DETAILED DESCRIPTION OF THE PREFERRED EMBODIMENTS

Figure 1:
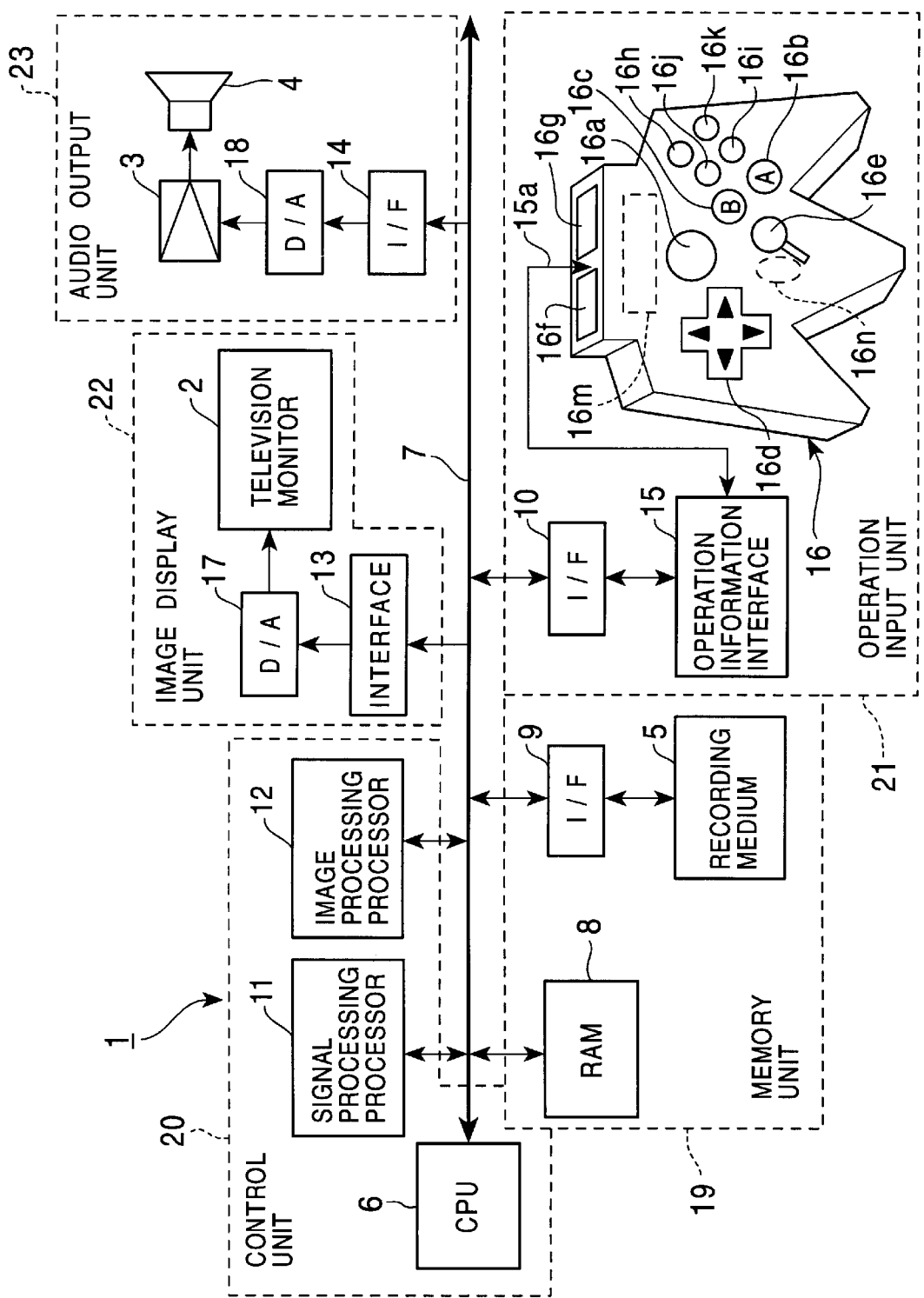
FIG. 1 is a configuration diagram illustrating a game system as an embodiment of the present invention.

FIG. 1 is a configuration diagram illustrating a game system 1 as an embodiment of the present invention.

The game system 1 is comprised of a main game unit, a television monitor 2 which is a display unit for displaying game screens (hereafter referred to as "monitor"), an amplifying circuit 3 and speaker 4 for outputting game audio, and a recording medium 5 whereupon are recorded game programs comprised of image data, sound data and program data. The recording medium 5 consists of a so-called ROM cassette wherein program data such as the above game programs or operating system is recorded in ROM or the like which is stored in a plastic case, or of an optical disk, a flexible disk, etc.

The main game unit is configured such that a bus 7 consisting of an address bus, data bus, and control bus is connected to a CPU 6, and connected to this bus 7 are a RAM 8, interface circuit 9, interface circuit 10, signal processing processor 11, image processing processor 12, interface circuit 13, and interface circuit 14, with a controller 16 being connected to the interface circuit 10 via an operation information interface circuit 15, a D/A converter 17 being connected to the interface circuit 13, and a D/A converter 18 being connected to the interface circuit 14.

A memory unit 19 is comprised of the above RAM 8, interface circuit 9, and recording medium 5; a control unit 20 for controlling the progressing of the game is comprised of the above CPU 6, signal processing processor 11, and image processing processor 12; an operation input unit 21 is configured of the above interface circuit 10, operation information interface circuit 15, and controller 16; an image display unit 22 is comprised of the above monitor 2, interface circuit 13, and D/A converter 17; and an audio output unit 23 is configured of the above amplifying circuit 3, speaker 4, interface circuit 14, and D/A converter 18.

The signal processing processor 11 performs mainly calculations in three-dimensional space, calculations for performing conversion from positions in three-dimensional space to positions in simulated three-dimensional space, light source calculating processing, and, generating and working processing for sound data.

The image processing processor 12 performs writing processing for image data to be drawn to a display area of the RAM 8, i.e., writing processing of texture data, based on the calculation results from the signal processing processor 11.

The controller 16 has, as an operating portion externally operable, a start button 16*a*, an A button 16*b*, a B button 16*c*, a cross key 16*d*, a stick-type controller 16*e*, a left trigger button 16*f*, a right trigger button 16*g*, a C1 button 16*h*, a C2 button 16*i*, a C3 button 16*j*, a C4 button 16*k*, and a depth trigger button 16*n*, such that operating signals according to the operation contents to the buttons are sent to the CPU 6.

The stick-type controller 16*e* is almost the same configuration as a joystick. That is, it has a vertically erected stick, and is configured such that this stick can be inclined in all directions 360üi, including forwards, rear, left and right, with the home position of this stick serving as a pivot, and is arranged such that the X-coordinates in the left and right and the Y-coordinates in the forward and rear directions with the erected position as the position of origin are output to the CPU 6 via the interface circuits 15 and 10, according to the direction of inclining and degree of inclining the stick.

Also, the controller 16 has a connector 16*m* to which card-type memory or the like is attachable for temporarily storing the progression state and the like of the game, for example.

The above game system 1 differs in form according to the use thereof.

That is, in the event that the game system 1 is configured for home use, the monitor 2, amplifying circuit 3, and speaker 4 are separate form the main game unit. Also, in the event that the game system 1 is configured for commercial use, all of the components shown in FIG. 1 are stored in a single integral housing.

Also, in the event that the game system 1 is configured around a personal computer or workstation, the monitor 2 corresponds to the display for the above computer, the image processing processor 12 corresponds to a portion of the game program data recorded in the recording medium 5 or hardware on an expansion board mounted in an expansion slot of the computer, the interface circuits 9, 10, 13, and 14, the D/A coverts 17 and 18, and the operation information interface circuit 15 correspond to hardware on an expansion board mounted in an expansion slot of the computer. Also, the RAM 8 corresponds to the main memory of the computer of various areas in expansion memory.

With the present embodiment, a description will be made with reference to an example of the game system 1 being configured for home use.

Next, description will be made regarding the general actions of the game system 1.

At the time that a power switch (omitted in the Figures) is turned on and power is supplied to the game system 1, the CPU 6 reads game programs including image data, sound data and program data form the recording medium 5, based on the operating system stored in the recording medium 5. Part or all of the read game program is stored in the RAM 8.

Subsequently, the CPU 6 operates to effect progression of the game, based on the game programs stored in the RAM 8, and the contents instructed by the game player via the controller 16. That is, the CPU 6 generates commands as tasks for drawing or sound output as appropriate, based on the operating signals sent out from the controller 16 according to input operations of the game player on the controller 16.

The signal processing processor 11 performs calculations of the position and the like of characters in three-dimensional space (of course, this is true for two-dimensional space as well) and light source calculations based on the above commands, and also has functions as an output control means for performing sound data generation processing.

Next, the image processing processor 12 performs writing processing and the like of image data to be drawn on the display area (frame buffer) of the RAM 8, based on the above calculation results. The D/A converter 17 converts the image data written into the RAM 8 into analog image signals at each certain cycle via the interface circuit 13, and displays these as images on the tube screen of the monitor 2.

On the other hand, the sound data output from the signal processing processor 11 is supplied to the D/A converter 18 via the interface circuit 14, and is converted into analog sound signals here, following which is output from the speaker 4 via the amplifying circuit 3 as background sounds, sound effects, and voice.

An overview of the video game executed by the game program recorded in the recording medium 5 is described below, with reference to FIGS. 8 through 12. FIGS. 8 through 12 are diagrams illustrating game screens.

With the present video game, pro baseball players (play characters) are the main character and are batters in a baseball game as starting members, and perform in accordance with operation of the controller 16 by the game player, and hitting figures thereof, that is, statistics, are disclosed following playing.

Figure 9:
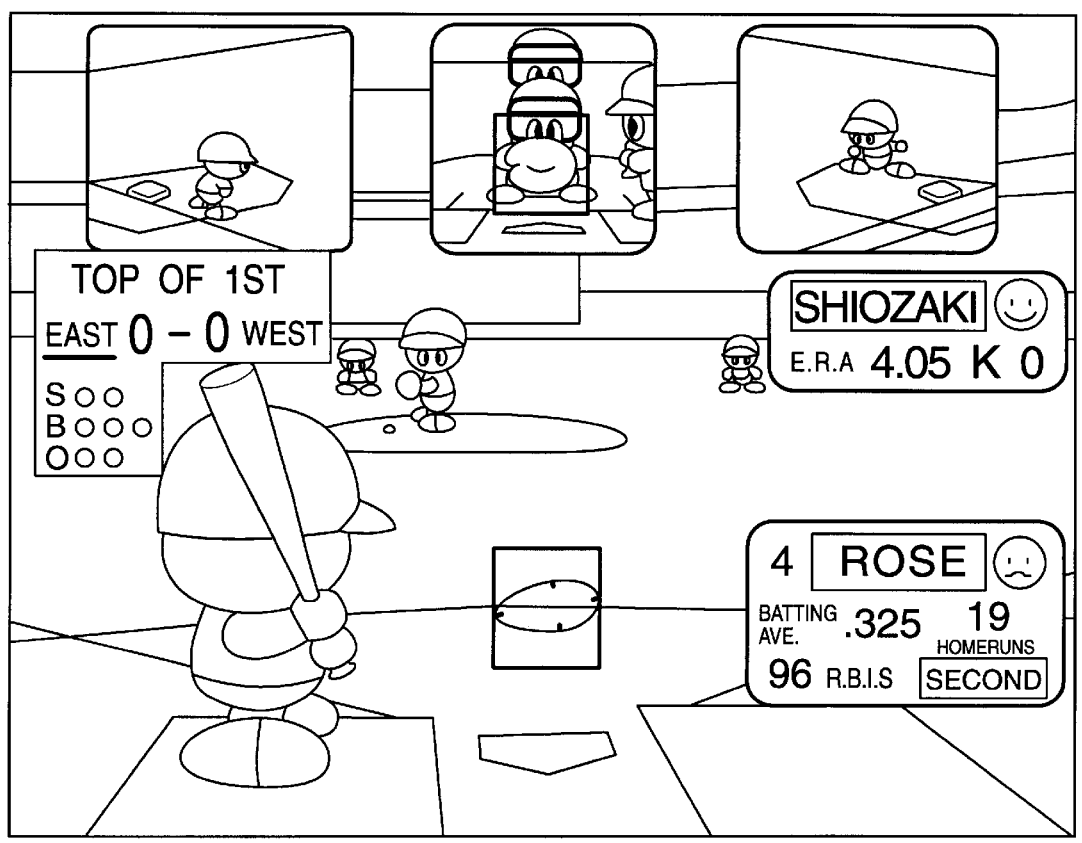
FIG. 9 is another diagram illustrating a screen of the video game.
Figure 10:
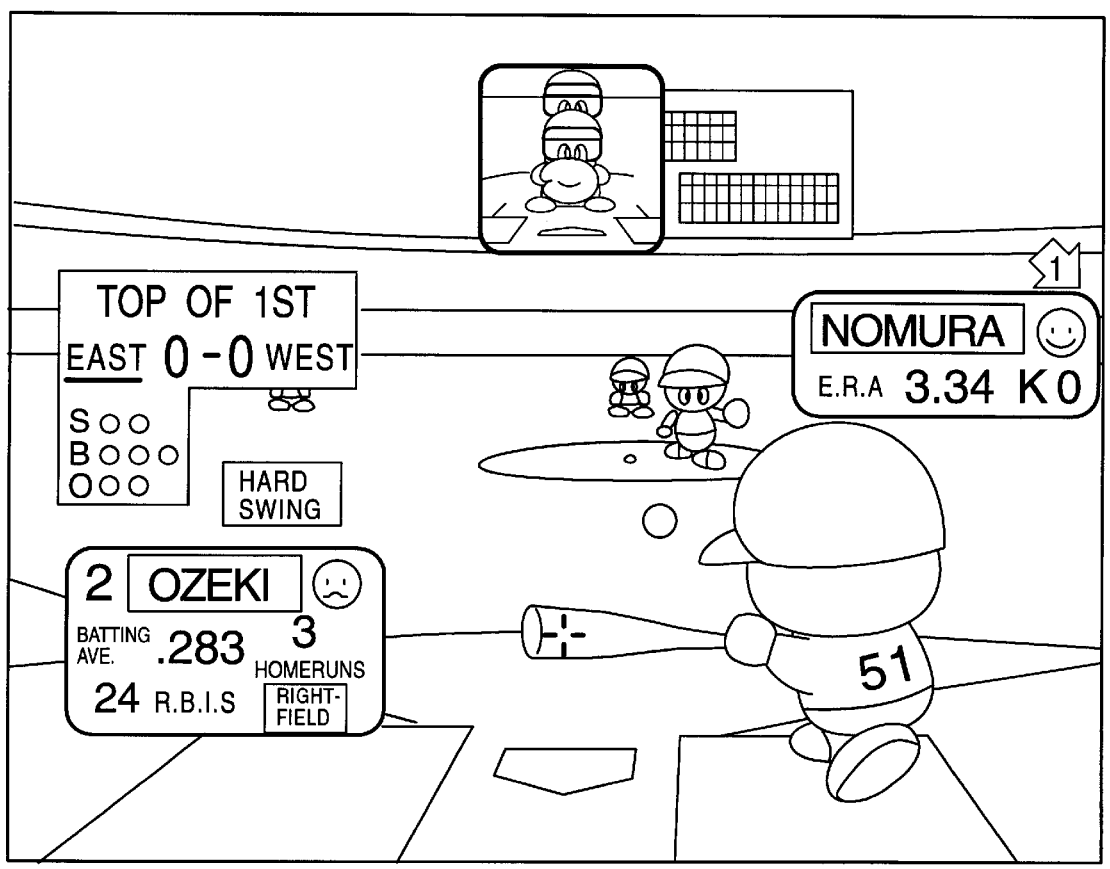
FIG. 10 is another diagram illustrating a screen of the video game.
Figure 11:
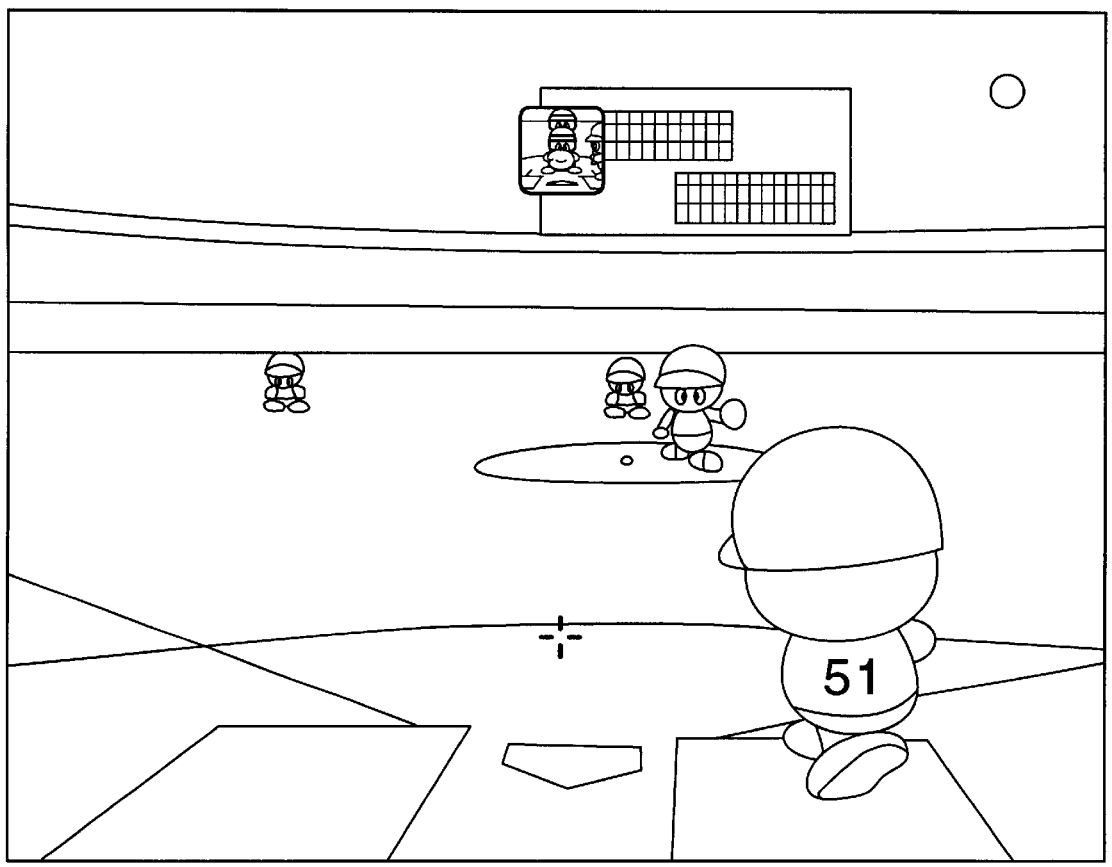
FIG. 11 is another diagram illustrating a screen of the video game.

The players and the like who are starting members from each team in the pennant or league mode are registered, as shown in FIG. 8. For the team at bat, the player who is a starting member is in the batter's box as a batter as shown in FIG. 9, and waiting for the opposing pitcher to pitch. Also the player is alternatively shown on base as a runner. A position of a catcher's mitt at this time is displayed at the upper center of the screen. Also, in the event that there are runners, the runners are shown at the upper left and right of the screen. In the event that the batter judges that a pitched ball will not come into a zone at which he is waiting, the batter does not swing, but as shown in FIGS. 10 and 11, in the event that the batter judges that the pitched ball will come into the zone at which he is waiting, the batter either swings hard or swings to meet the ball.

For the fielding team, the player stands on the pitcher's mound as a pitcher and pitches to the opposing batter as shown in the Figure. Or, the players scatter to their respective fielding positions as fielders.

Figure 12:
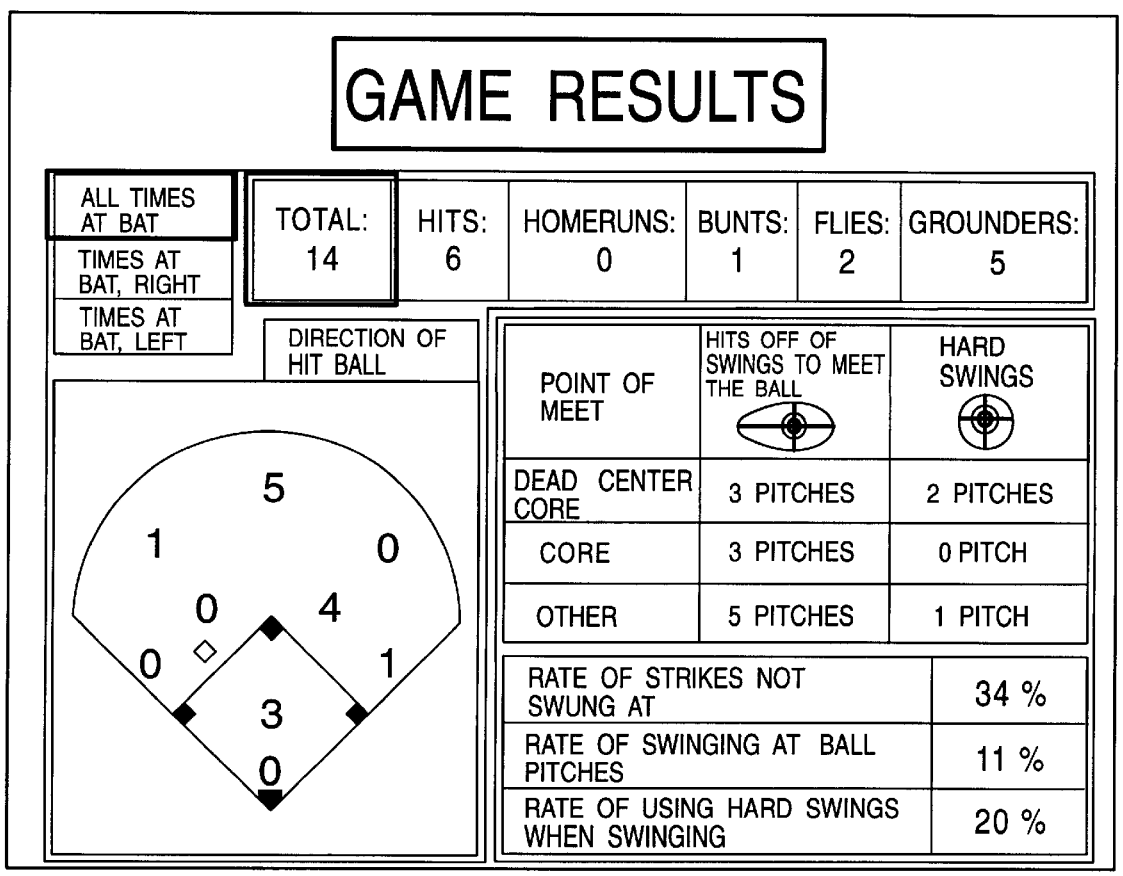
FIG. 12 is another diagram illustrating a screen of the video game.

A batting record screen is comprised of the record of each player in a table form, to which is added the R.B.I. point data for use of a meet cursor defining an anticipated position whereat a ball meets a bat, and sliding data, as shown in FIG. 12.

The following is a description of the hitting record contents.

Batting figures are recorded with abbreviations of fielding positions and batting results. Also, records such as (R H) and (S G) are batting results combined with the position of a fielder who handled a hit ball. On the other hand, in the event that a fielder is not involved, such as in the case of a home run, the description is combined with the direction of the hit ball, such as (R HR). Also, there are special records, such as (SB FC). The following are examples of these, with the abbreviation in front of the "?", and the meaning behind.
(By Fielding Position)
P ? pitcher, C ? catcher, 1st ? first baseman, 2nd ? second baseman, 3rd ? third baseman, S ? shortstop, L ? left fielder, C ? centerfield, R ? right fielder.
(By Batting Result)
H ? hit, D ? double, T ? triple, HR ? home run, SB ? sacrifice bunt, S ? squeeze play, Sf ? sacrifice fly, G ? grounder, DP ? double play, Fl ? fly, Ff ? foul fly, L ? line drive, FC ? fielder's choice, E ? error.
(Special Batting Records)
RHR ? home run in the park, W ? walk, DB ? dead ball, SR ? swing-and-run (on a third strike), IW ? intentional walk, SB FC ? combination of a sacrifice bunt and a fielder's choice (including cases of squeeze plays), SB E ? combination of a sacrifice bunt and an error (including cases of squeeze plays), SO ? a strikeout where the batter did not swing at the last strike, SW ? a strikeout where the batter swung at the last strike, SF E ? combination of a sacrifice fly and an error.

Next, the batting recording method is described.

Each record is recorded by being classified into data based on the record results (hit, home run, bunt, fly, grounder), the direction of the hit ball (by fielding position), and hitting point (dead center core, core, and others dealing with whether swinging to meet the ball or swinging hard). The records are displayed by vertically operating the direction keys of the stick-type controller 16e and the like of the operating controller 16 to select all times at bat, times at bat, right, and times at bat, left, and by sideways operating of the direction keys to select total, hits, home runs, bunts, flies, and grounders, and items other than swing information show the data indicated by the cursor.

Now, the hitting points of dead center core, core, and other, are determined by a distance between the center of the meet cursor and the center of the ball. The swing information consists of judgment being made at the time of swinging whether the pitch was a strike or ball, the data is stored, the data is subjected to statistics processing as a rate of swinging at strikes and a rate of swinging at balls, and then displayed. That is, "Swung."

"In the case of a strike, count as a swing at a strike", "In the case of a ball, count as a swing at a ball."

"Rate of swinging at strikes=number swings at strikes/ total number of swings * 100", "Rate of swinging at balls=number swings at balls/total number of swings * 100."

Also, the rate of hard swings at the time of swinging consists of the data for hard swings at the time of swinging being recorded and compared with the overall swinging data, and displayed.

That is,

"Swung."

"In the case of swinging to meet a pitch, increment the number of times swinging to meet a pitch", "In the case of swinging hard, increment the number of times swinging hard."

"Rate of swinging hard at the time of swinging=number of hard swings/total number of swings * 100"

Also, moving, etc., of the cursor to switch between "all times at bat", "times at bat, right", "times at bat, left", at the upper left of the screen shown in FIG. 12 allows the display format to remain the same but the data expression to be changed.

Also, moving, etc., of the cursor to switch between "all", "hit", "home run", "bunt", "fly", and "grounder", at the center to upper right of the screen shown in FIG. 12 allows the display format to remain the same but the data expression to be changed.

Also, "rate of not swinging at strikes" may be used instead of "rate of swinging at strikes". This can be calculated by (number of strikes not swung at/total number of swings) * 100. Also, "rate of hard swings at the time of swinging" may be re-phrased as "rate of using hard swinging at the time of swinging", FIG. 2 is a function block diagram of the principal components shown in FIG. 1.

Figure 2:
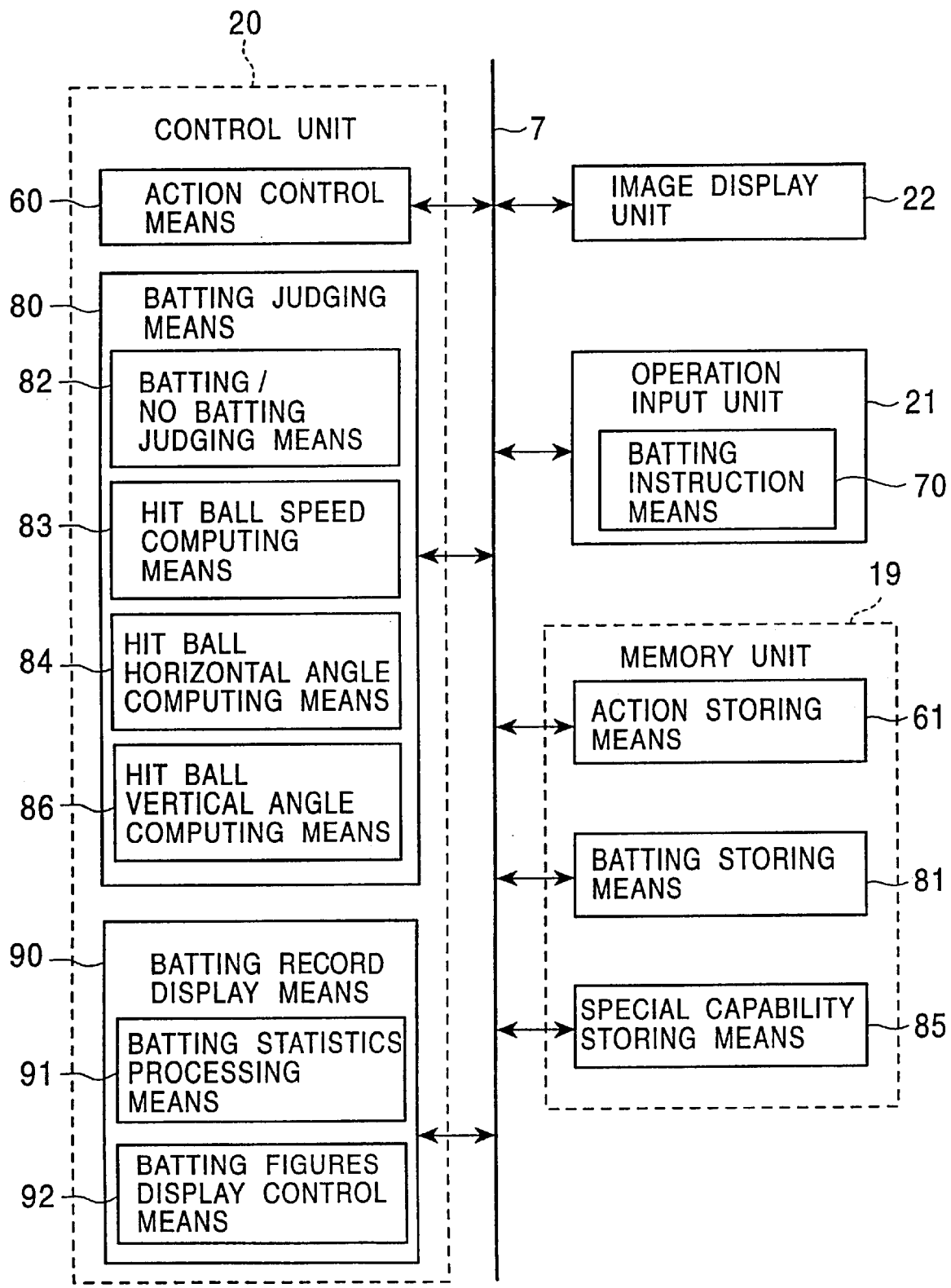
FIG. 2 is a function block diagram for the principal portions of the present device.

As shown in FIG. 2, the video game device according to the present embodiment (hereafter referred to as "present device") is the same as the conventional example in comprising an image display unit (display device) 22 which is a monitor 2 or the like for displaying a player which is a play character and the action contents thereof, and for displaying menus corresponding to various actions of the player, an operating input unit (operating unit) 21 which is an operating controller 16 or the like capable of selectively effecting a menu selection regarding arbitrary actions from these various menus, an action storing means 61 for storing the action contents of the play character in a manner corresponding to the input operations at the operating input unit 21; and an action control means 60 for reading from action storing means 61 the action contents according to the instructions from the operation input unit 23 and causing the play character to perform the same.

However, the present device differs from the conventional example in comprising: a batting instructing means 70 for instructing the play character which is a batter in a baseball game of batting instruction contents; a batting judging means 80 for judging the batting contents based on the batting instruction contents and the instruction results of the action contents; a batting storing means 81 for storing the batting judgment contents; and a batting record display means 90 for reading the batting judgment contents from the batting storing means and displaying on the image display device 22.

The device can be simplified by including the above batting instructing means 70 in the operating input unit 21.

Incidentally, the batting judging means 80 and batting record display means 90 are configured within the control unit 20, and the batting storing means 81 within the memory unit 19.

Further, the batting judging means 80 may be provided with a batting/no-batting judging means 82 for judging whether or not the bat on the screen hit the ball, based on batting position data and batting timing data of the batting instruction contents, and on pitching data of the instruction results of the action contents. Further, the batting judging means 80 may be provided with a hit ball speed computing means 83 for computing a speed of a hit ball based on the batting position data, batting timing data, and hard swing data of the batting instruction contents, and on batter power data of the instruction results of the action contents, in the event that judgement has been made by the batting/no-batting judging means 82 that the bat on the screen hit the ball. Further, the batting judging means 80 may be provided with a hit ball horizontal angle computing means 84 for computing a horizontal angle of a hit ball on the screen, based on the batting position data of the batting instruction contents, and on the pitching data of the instruction results of the action contents, in the event that judgement has been made by the batting/no-batting judging means 82 that the bat on the screen hit the ball.

Further, the batting judging means 80 may comprise: a special capability storing means 85 for storing special capabilities of batters (e.g., a power hitter, grand-slam homer, etc.); and a hit ball vertical angle computing means 86 for computing a vertical angle of a hit ball on the screen, based on the batting position data and hard swing data of the batting instruction contents, and on the special capabilities, in the event that judgement has been made by the batting/no-batting judging means 82 that the bat on the screen hit the ball.

Further, the batting record display means 90 may comprise: a batting statistics processing means 91 for performing statistics processing on the batting judgement contents; and a batting figures display control means 92 for performing screen control such that the batting judgement contents subjected to the statistics processing are displayed all at once on the image display unit 22 following the end of play.

Incidentally, the batting/no-batting judging means 82, hit ball speed computing means 83, hit ball horizontal angle computing means 84, hit ball vertical angle computing means 86, batting statistics processing means 91, and batting figures display control means 92 are constructed within the control unit 20, and the special capability storing means 85 within the memory unit 19.

Next, the actions of the present device will be described with reference to the flowcharts shown in FIGS. 3 through 7; the video game play control method can be manifested by these actions.

Figure 3:
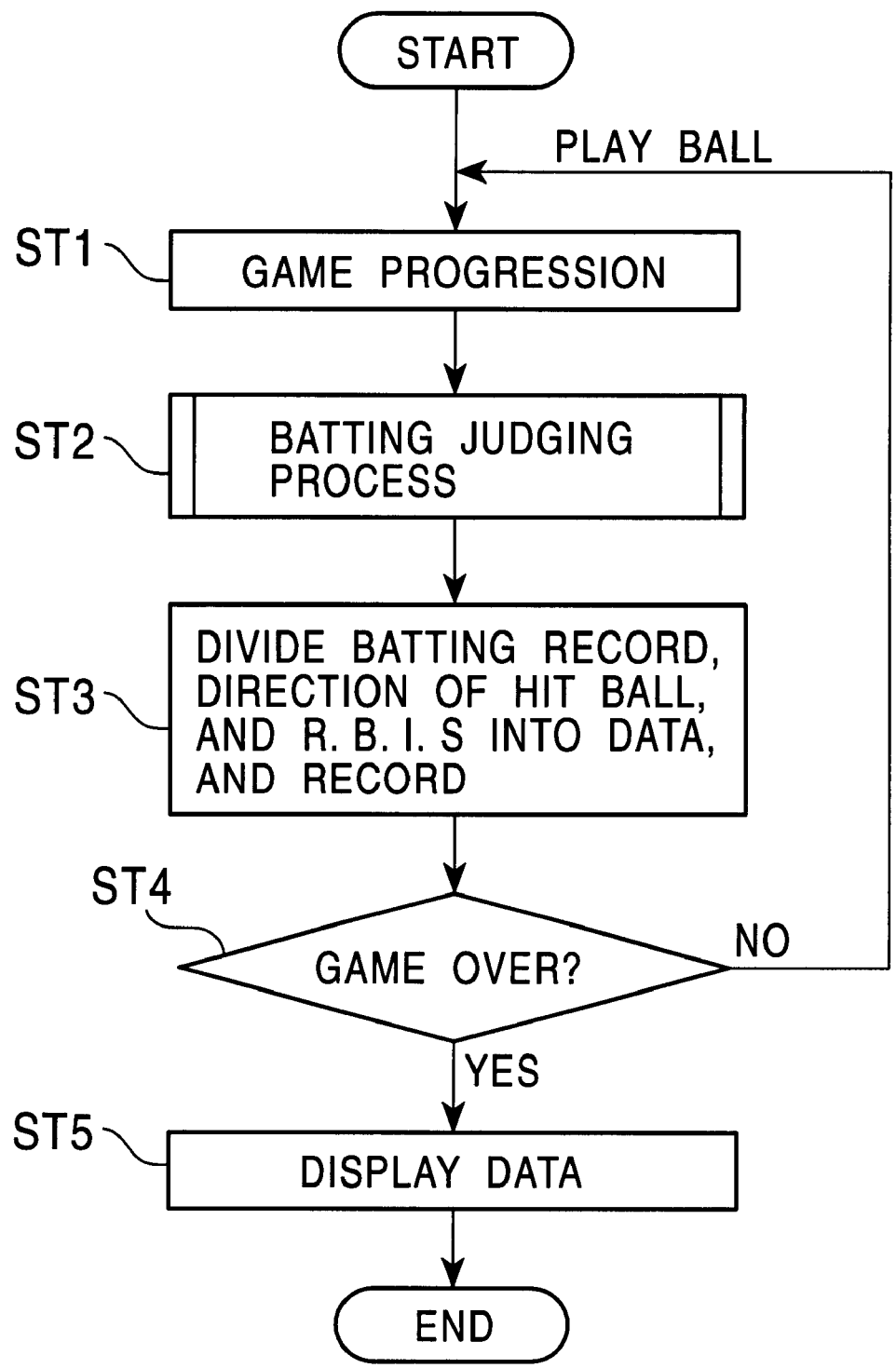
FIG. 3 is a flowchart illustrating the general action of the present device.

First, in FIG. 3, multiple menus are displayed on the video screen, and the operating input unit 21 selects and instructs a desired menu from these. As a result, the action contents corresponding to the selected and instructed menu are executed. Specifically, the play character is a baseball game batter, and the baseball game proceeds with this batter, as described above (step ST1). In the event that certain batting instruction contents are instructed to this batter by the batting instructing means 70, the batting contents are judged according to the instruction results of the action contents and the batting instruction contents (step ST2). As for the above batting instruction contents, having batting position data and batting timing data is sufficient, and adding hard swing data to this can provide a game with more sense of reality.

Figure 4:
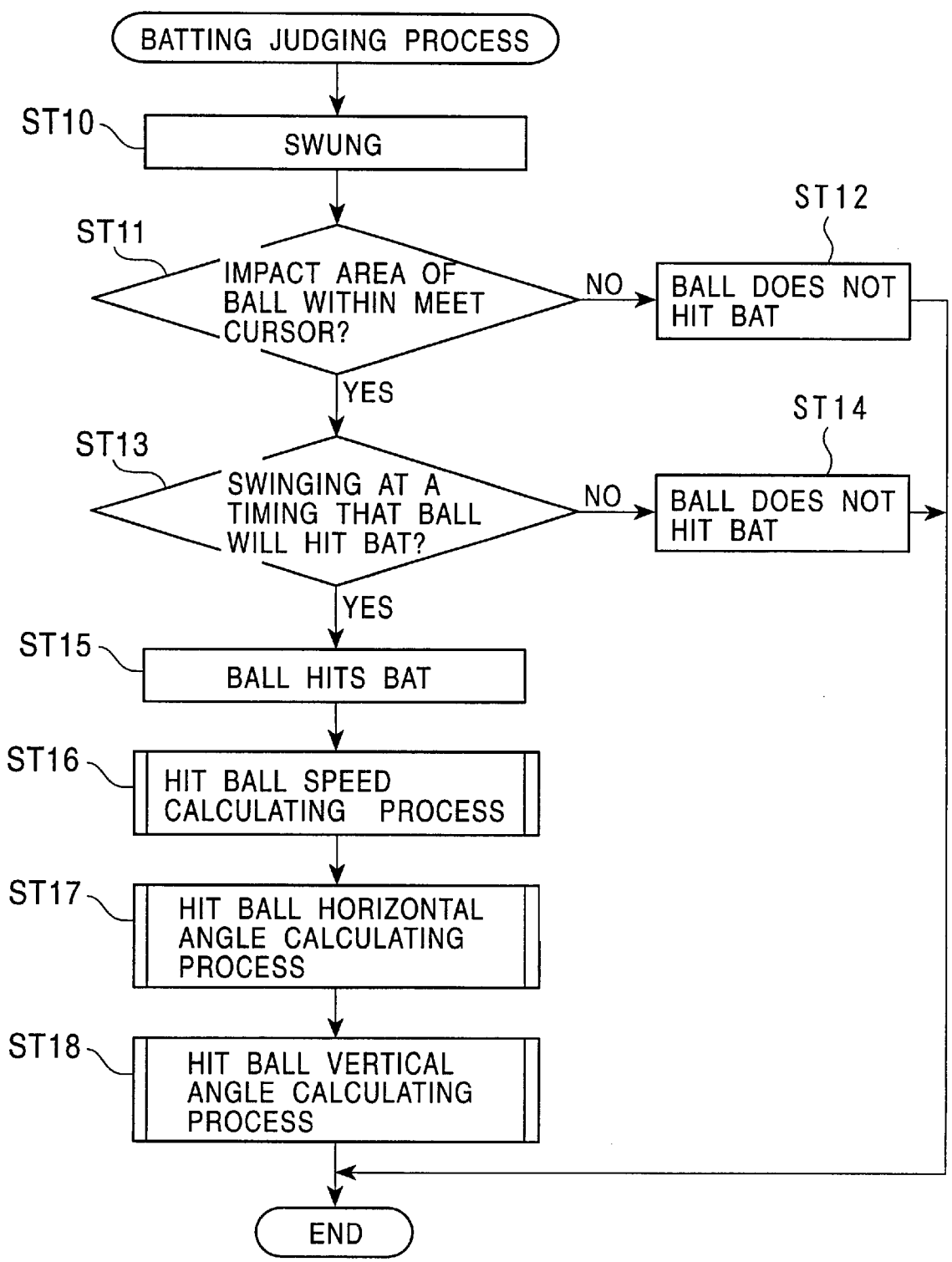
FIG. 4 is another flowchart illustrating the general action of the present device.

The batting judgement of the above step ST2 is performed following a flow such as shown in FIG. 4. As shown in FIG. 9, a batter is standing in the batter's box on the screen. Next, the batter swings at the ball which the opponent pitcher has pitched, by batting instructions from the game player operating the operating controller 16, as shown in FIGS. 11 and 12 (step ST10). At this time, judgement is made regarding whether or not an impact point of the ball is within the meet cursor, by the batting/no-batting judging means 81 of the batting judging means 80 (step ST11). In the event that judgement is made that the impact point of the ball is not within the meet cursor, the ball does not hit the bat (step ST12), and the process ends (i.e., returns). This is the same for subsequent flows.

In the event that judgement is made by the batting/no-batting judging means 81 that the impact point of the ball is within the meet cursor, the same means 81 further judges whether or not the bat is swung with a timing that the ball will hit the bat (step ST13). In the event that judgement is made that the bat is not swung with a timing that the ball will hit the bat, the ball does not hit the bat (step ST14), and the process ends, but in the event that judgement is made that the bat is swung with a timing that the ball will hit the bat, the ball hits the bat (step ST15). Thus, whether the bat hit the ball can be accurately judged, so a game full of realistic sensation can be expected.

At this time, the batting/no-batting judging means 81 calculates the distance between the impact point and the dead center core, the batting point at the meet cursor, and a vertical offset in the vertical direction of the meet cursor. However, these calculations may be performed by the following computing means. It should be noted that the order of execution of the computing means may be mutually changed.

Figure 5:
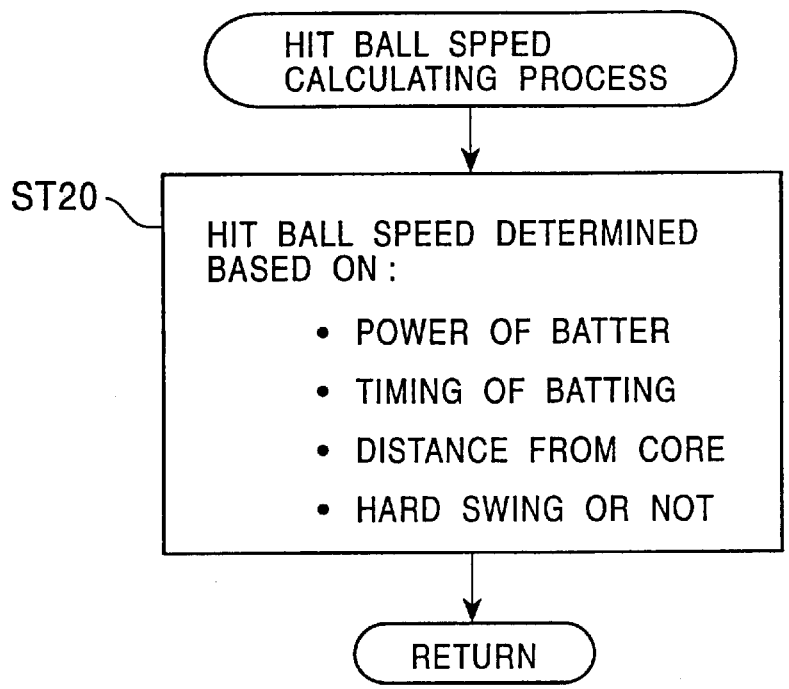
FIG. 5 is another flowchart illustrating the general action of the present device.
Figure 6:
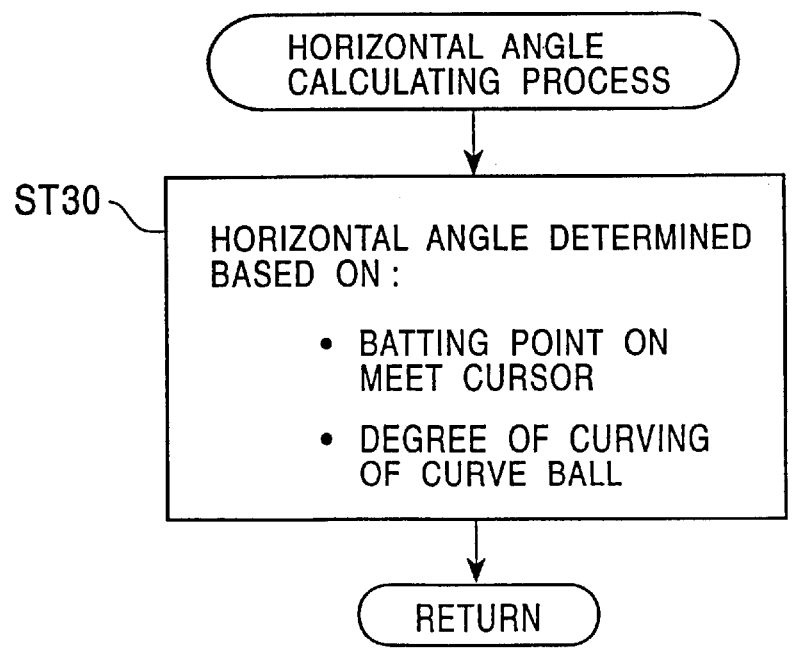
FIG. 6 is another flowchart illustrating the general action of the present device.

Next, the hit ball speed computing means 83 performs hit ball speed calculating processing (step ST14). Specifically, as shown in FIG. 5, the hit ball speed is determined by the hit ball speed computing means 83 based on the batter power data of the instruction results of the action contents, and on the batting timing data and hard swing data of the batting instruction contents, and distance from the dead center core which is the above calculation contents (step ST20). Thus, a sufficiently accurate hit ball speed can be obtained, so a game full of realistic sensation can be expected.

Next, the hit ball horizontal angle computing means 84 performs horizontal angle calculating processing (step ST17). Specifically, as shown in FIG. 9, the horizontal angle is determined by the hit ball horizontal angle computing means based on the hitting point on the meet cursor calculated by the batting/no-batting judging means 82, and on the degree of curving of curving pitches, of the instruction results of the action contents (step ST30). Thus, a sufficiently accurate hit ball horizontal angle can be obtained, so a game full of realistic sensation can be expected.

Figure 7:
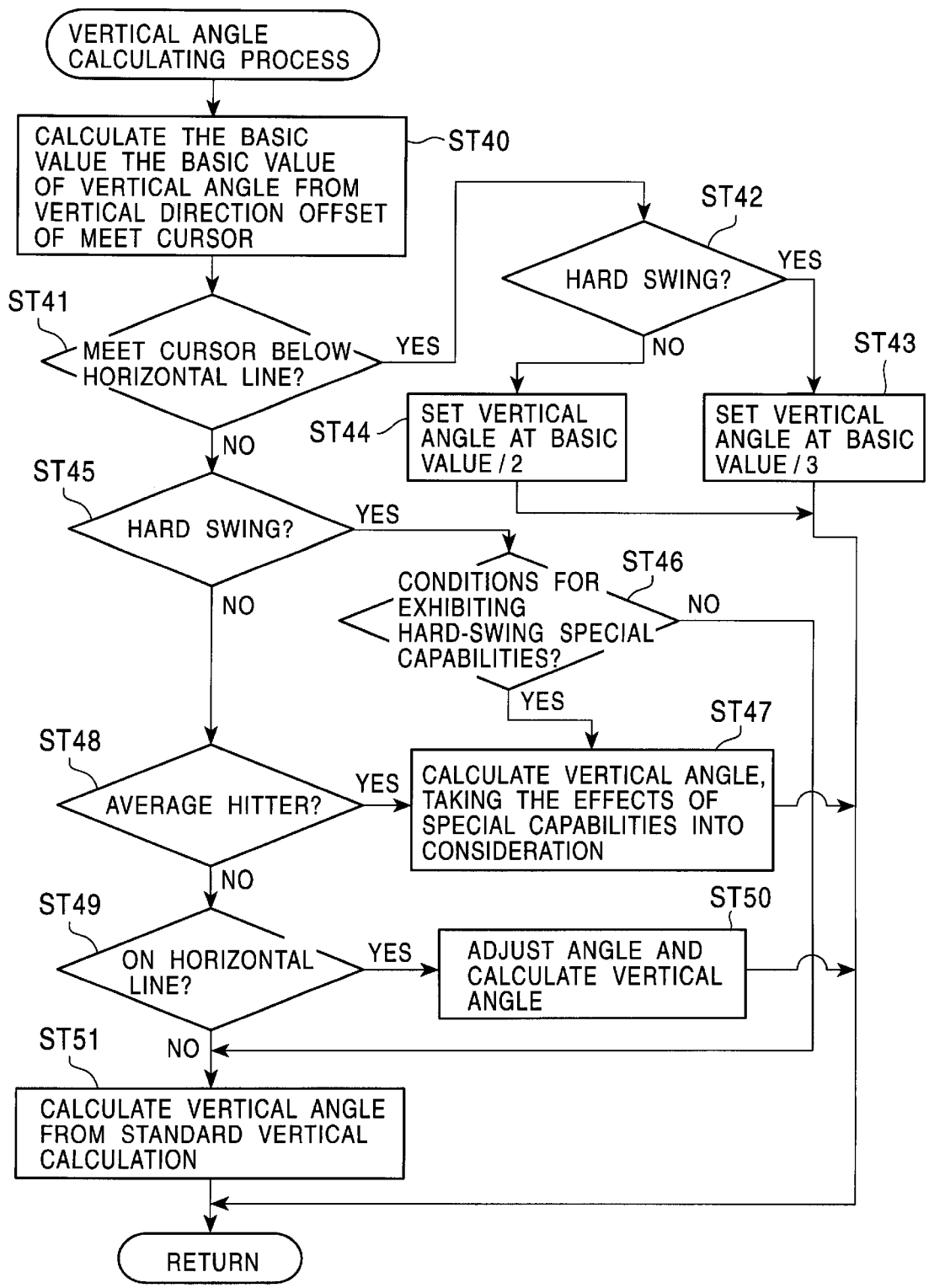
FIG. 7 is another flowchart illustrating the general action of the present device.

Next, the hit ball vertical angle computing means 86 performs vertical angle calculating processing (step ST18). Specifically, as shown in FIG. 7, the hit ball vertical angle computing means 86 calculates a basic value based on the vertical offset of the meet cursor calculated by the batting/no-batting judging means 82 (step ST40), and judgment is made regarding whether or not the meet cursor is lower than the horizontal line (step ST41).

In the event that the hit ball vertical angle computing means 86 judges that the meet cursor is lower than the horizontal line, further judgement is made regarding whether the swing is hard or not (step ST42), and in the event that the swing is judged to be hard, the vertical direction is ⅓ of the basic value (step ST43), but in the event that the swing is judged not to be hard, the vertical direction is ½ of the basic value (step ST44).

In the event that the hit ball vertical angle computing means 86 judges that the meet cursor is not lower than the horizontal line in step ST41, further judgement is made regarding whether the swing is hard or not (step ST45), and in the event that the swing is judged to be hard, judgement is made regarding special capability exhibiting conditions, such as whether a power hitter, grand-slam homer hitter, etc. (step ST46) is batting. Here, in the event that the conditions are fulfilled, the effects of the special capabilities are taken into consideration (step ST47), and in the event that the conditions are not fulfilled, the flow proceeds to the following step ST51.

On the other hand, in the event that judgement is made in the above step ST45 that the swing is not hard, the hit ball vertical angle computing means 86 further judges whether or not the batter is an average hitter (step ST48). Now, in the event that the batter is judged to be an average hitter, the flow proceeds to the above step ST47, but in the event that the batter is judged not to be an average hitter, judgement is made regarding whether above the horizontal line or not (step ST49).

Now, in the event that judgement is made that this is above the horizontal line, the hit ball vertical angle computing means 86 performs angle adjustment in the vertical direction (step ST50), but in the event that judgement is made that this is not above the horizontal line, standard vertical calculations are performed (step ST51). Thus, a sufficiently accurate hit ball vertical angle can be obtained, so a game full of realistic sensation can be expected.

Then, returning to FIG. 3, the above batting judgement contents are classified by type, such as data for batting record, hit ball direction, and R.B.I., and are continuously stored to the batting storing means 81 (step ST3). However, these do not necessarily have to be classified by data at the time of storing, and may be classified after having been read out. Also, these do not necessarily have to be continuously stored, and may be stored in batch fashion.

Following judgement regarding whether or not the game has ended (step ST4), the batting judging contents read from the batting storing means 81 are displayed on the batting record display means 90 (step ST5). At this time, the above batting judging contents are subjected to statistics processing calculation of the swing rates and so forth, such as described above by the batting statistics processing means 91, and processing results thereof are controlled so as to be displayed on a screen of the image display unit 22 as batting figures, which include those representative of batting habits of the batter, such as shown in FIG. 12, by the batting figures display control means 92. Incidentally, in the event that there is leeway at the CPU 6 and the like, i.e., excess computing capacity, statistics calculation may be performed each time something is recorded, so that the results can be displayed on the screen any time that the player instructs so.

As described above, the player can cause the baseball batter to perform a simulation experience in a manner closer to a real play, thereby obtaining a batting record, whereby the habits of the player can be known, so the game has a sense of reality, and is absorbingly interesting.

Incidentally, the above processes (step ST1 through ST5, etc.) are recorded in a readable recording medium as game program data of the present device, read out at the time of starting the game, and provided to the game.

Also, the present invention may be arranged as a video game device, comprising: a display device for displaying baseball batting figures; an operating unit for instructing the progression of the game; a storing means for storing the batting figures in a manner corresponding to the input operations at the operating unit; and a control means for controlling progression of the game in a manner corresponding to the instructions from the operating unit; the video game device comprising: a batting instructing means for instructing the play character as a batter in a baseball game of batting instruction contents; a batting judging means for judging the batting contents based on the progression of the game; a batting storing means for storing the batting judgment contents; and a batting record display means for reading the batting judgment contents from the batting storing means and displaying on the display device. According to this arrangement, the batting record obtained as the result of the game progression can be referred to.

The video game device may be arranged such that the batting judging means judges whether or not the batting results come under categories of multiple items, and the batting record display means accumulates and records the numbers coming under each of the multiple items. Thus, batting records for each item can be referred to more readily.

Further, the video game device may be arranged such that one of the above items is a position to which the hit ball has been hit, and the display device displays a baseball diamond and the accumulated number of hit balls on the positions on the diamond corresponding to the positions which hit balls have flown. Thus, one can easily visually recognize and obtain an image of one's own batting record.

Also, these contents are also applied to the video game play control method, and a readable recording medium on which the method thereof is recorded.

According to the first, second, and third aspects of the invention, multiple menus are displayed on a video screen, and the operating unit selects and instructs a desired menu from these. As a result, action contents corresponding to the menu selected and instructed are executed. In the event that a play character which is a batter in a baseball game is instructed of batting contents by a batting instructing means, the batting contents are judged by batting judging means based on the batting instruction contents and the instruction results of the action contents, the batting judgment contents are stored in a batting storing means, and the batting judgment contents are read from the batting storing means by the batting record display means and displayed on the display device. Thus, the player can cause the baseball batter to perform a simulation experience in a manner closer to a real play, so the game has a sense of reality, is absorbingly interesting, and the habits of the player can easily be known from the batting record thereof.

An arrangement may be made wherein the operating unit includes the batting instructing means, which would serve to facilitate simplifying of the device.

Arrangements may also be made wherein the batting contents includes batting position data and batting timing data, and wherein the batting contents further includes hard swing data, which would serve to make the game full of a sense of reality.

Further, the batting judging means may comprise a batting/no-batting judging means for judging whether or not the bat on the screen hit the ball, based on batting position data and batting timing data of the batting instruction contents, and on pitching data of the instruction results of the action contents, which would serve to accurately judge whether the bat hit the ball, so a game full of sense of reality can be expected.

Further, the batting judging means may comprise a hit ball speed computing means for computing the speed of a hit ball based on the batting position data, batting timing data, and hard swing data of the batting instruction contents, and on the batter power data of the instruction results of the action contents, in the event that judgement has been made by the batting/no-batting judging means that the bat on the screen has hit the ball, and this would serve to obtain sufficient batting speed, so a game full of sense of reality can be expected.

Further, the batting judging means may comprise a hit ball horizontal angle computing means for computing the horizontal angle of a hit ball on the screen, based on the batting position data of the batting instruction contents, and on the pitching data of the instruction results of the action contents, in the event that judgement has been made by the batting/no-batting judging means that the bat on the screen has hit the ball, which would serve to obtain the horizontal angle of the hit ball with sufficient accuracy, so a game full of sense of reality can be expected.

Further, an arrangement may be made wherein the batting judging means comprises: a special capability storing means for storing special capabilities of batters; and a hit ball vertical angle computing means for computing the vertical angle of a hit ball on the screen, based on the batting position data and hard swing data of the batting instruction contents, and on the special capabilities, in the event that judgement has been made by the batting/no-batting judging means that the bat on the screen has hit the ball, which would serve to obtain the vertical angle of the hit ball with sufficient accuracy, so a game full of sense of reality can be expected.

Further, an arrangement may be made wherein the batting record display means comprises: a batting statistics processing means for performing statistics processing on the batting judgement contents; and a batting figures display control means for performing screen control such that the batting judgement contents subjected to the statistics processing are displayed all at once on the display unit following the end of play, which would facilitate easily knowing the hereof.

What is claimed is:

1. A video game device for allowing a player to play a baseball video game, comprising:
    a display device for displaying play characters and action contents comprised of various selectable actions associated with a particular one of the play characters, and for displaying menus corresponding to said various selectable actions of the play characters;
    an operating unit operable to allow the player to give instructions regarding selection of at least of said various selectable actions from said menus, said at least one of said various selectable actions selected by the player thereby defining operation contents;
    action storing means for storing selected action contents of the play character which correspond to operation contents defined by selective operation of said operating unit by the player;
    action control means for reading from said action storing means the selected action contents according to the instructions from said operating unit, and causing the play character to perform said selected action contents;
    batting instructing means for instructing a selected one of the play characters which is a batter by use of batting instruction contents defined by player operation of said batting instructing means;
    batting judging means for judging batting results in terms of at least one of hit ball direction and batting point and defining batting judging contents corresponding thereto, judging of said batting results being based on the batting instruction contents and said selected action contents;
    batting storing means for storing said batting judgment contents; and
    batting record display means for displaying batting records, said batting record display means including:
        batting statistics processing means for performing statistics processing on said batting judgment contents and storing processed batting judgment contents to said batting storing means; and
        batting figures display control means for reading the processed batting judgment contents from said batting storing means and displaying the processed batting judgment contents on said display device.

2. A video game device according to claim 1, wherein said operating unit includes said batting instructing means.

3. A video game device according to claim 1, wherein said batting instructing contents includes batting position data and batting timing data.

4. A video game device according to claim 1, wherein said batting judging means comprises a batting/no-batting judging means for judging whether or not the bat on the screen hit the ball, based on batting position data and batting timing data of said batting instruction contents, and on pitching data of the instruction results of said action contents.

5. A video game device according to claim 2, wherein said batting instructing contents includes batting position data and batting timing data.

6. A video game device according to claim 2, wherein said batting judging means comprises a batting/no-batting judging means for judging whether or not the bat on the screen hit the ball, based on batting position data and batting timing data of said batting instruction contents, and on pitching data of the instruction results of said action contents.

7. A video game device according to claim 2, wherein said batting figures display control means includes means for performing screen control such that the processed batting judgement contents subjected to said statistics processing are displayed all at once on said display unit following an end of play.

8. A video game device according to claim 3, wherein said batting instructing contents further includes hard swing data.

9. A video game device according to claim 3, wherein said batting judging means comprises a batting/no-batting judging means for judging whether or not the bat on the screen hit the ball, based on batting position data and batting timing data of said batting instruction contents, and on pitching data of the instruction results of said action contents.

10. A video game device according to claim 3, wherein said batting figures display control means includes means for performing screen control such that the processed batting judgement contents subjected to said statistics processing are displayed all at once on said display unit following an end of play.

11. A video game device according to claim 8, wherein said batting judging means comprises a batting/no-batting judging means for judging whether or not the bat on the screen hit the ball, based on batting position data and batting timing data of said batting instruction contents, and on pitching data of the instruction results of said action contents.

12. A video game device according to claim 8, wherein said batting figures display control means includes means for performing screen control such that the processed batting judgement contents subjected to said statistics processing are displayed all at once on said display unit following an end of play.

13. A video game device according to claim 4, wherein said batting judging means comprises a hit ball speed computing means for computing the speed of a hit ball based on the batting position data, batting timing data, and hard swing data of said batting instruction contents, and on the batter power data of the instruction results of said action contents, in the event that judgement has been made by said batting/no-batting judging means that the bat on the screen has hit the ball.

14. A video game device according to claim 4, wherein said batting judging means comprises:
    a special capability storing means for storing special capabilities of batters; and
    a hit ball vertical angle computing means for computing the vertical angle of a hit ball on the screen, based on the batting position data and hard swing data of said batting instruction contents, and on said special capabilities, in the event that judgement has been made by said batting/no-batting judging means that the bat on the screen has hit the ball.

15. A video game device according to claim 4, wherein said batting figures display control means includes means for performing screen control such that the processed batting judgement contents subjected to said statistics processing are displayed all at once on said display unit following an end of play.

16. A video game device according to claim 14, wherein said batting figures display control means includes means for performing screen control such that the processed batting judgement contents subjected to said statistics processing are displayed all at once on said display unit following an end of play.

17. A video game device according to claim 13, wherein said batting judging means comprises a hit ball horizontal angle computing means for computing the horizontal angle of a hit ball on the screen, based on the batting position data of said batting instruction contents, and on the pitching data of the instruction results of said action contents, in the event that judgement has been made by said batting/no-batting judging means that the bat on the screen has hit the ball.

18. A video game device according to claim 13, wherein said batting judging means comprises:
   a special capability storing means for storing special capabilities of batters; and
   a hit ball vertical angle computing means for computing the vertical angle of a hit ball on the screen, based on the batting position data and hard swing data of said batting instruction contents, and on said special capabilities, in the event that judgement has been made by said batting/no-batting judging means that the bat on the screen has hit the ball.

19. A video game device according to claim 13, wherein said batting figures display control means includes means for performing screen control such that the processed batting judgement contents subjected to said statistics processing are displayed all at once on said display unit following an end of play.

20. A video game device according to claim 17, wherein said batting judging means comprises:
   a special capability storing means for storing special capabilities of batters; and
   a hit ball vertical angle computing means for computing the vertical angle of a hit ball on the screen, based on the batting position data and hard swing data of said batting instruction contents, and on said special capabilities, in the event that judgement has been made by said batting/no-batting judging means that the bat on the screen has hit the ball.

21. A video game device according to claim 17, wherein said batting figures display control means includes means for performing screen control such that the processed batting judgement contents subjected to said statistics processing are displayed all at once on said display unit following an end of play.

22. A video game play control method, comprising:
   displaying play characters and action contents comprised of various selectable actions associated with a particular one of the play characters and menus corresponding to said various selectable actions of the play characters;
   inputting instructions comprised of operation contents regarding selection of at least one of said various selectable actions from said menus;
   storing selected action contents of the play character which correspond to the operation contents;
   reading the selected action contents according to the instructions from said step of inputting, and causing the play character to perform said selected action contents;
   in an event that a selected one of said play characters is a batter in a baseball game, giving batting instruction to said selected one of said play characters by use of batting instruction contents defined by player input;
   judging batting results in terms of at least one of hit ball direction and batting point and defining batting judging contents corresponding thereto, judging of said batting results being based on the batting instruction contents and said selected action contents;
   performing statistics processing on said batting judgement contents to produce processed batting judgement contents;
   storing said processed batting judgment contents; and
   reading and displaying the processed batting judgment contents from storage.

23. A readable recording medium having stored thereon program data for a video game play control method comprising executable code for execution by a computer processor causing said computer processor to perform the steps of:
   displaying play characters and action contents comprised of various selectable actions associated with a particular one of the play characters and menus corresponding to said various selectable actions of the play characters;
   inputting instructions comprised of operation contents regarding selection of at least one of said various selectable actions from said menus;
   storing selected action contents of the play character which correspond to the operation contents;
   reading the selected action contents according to the instructions from said step of inputting, and causing the play character to perform said selected action contents;
   in an event that a selected one of said play characters is a batter in a baseball game, giving batting instruction to said selected one of said play characters by use of batting instruction contents defined by player input;
   judging batting results in terms of at least one of hit ball direction and batting point and defining batting judging contents corresponding thereto, judging of said batting results being based on the batting instruction contents and said selected action contents;
   performing statistics processing on said batting judgement contents to produce processed batting judgement contents;
   storing said processed batting judgment contents; and
   reading and displaying the processed batting judgment contents from storage.

24. A video game device for allowing a player to play a baseball video game, comprising:
   a display device for displaying play characters and action contents comprised of various selectable actions associated with a particular one of the play characters, and for displaying menus corresponding to said various selectable actions of the play characters;
   an operating unit operable to allow the player to give instructions regarding selection of at least of said various selectable actions from said menus, said at least one of said various selectable actions selected by the player thereby defining operation contents;
   action storing means for storing selected action contents of the play character which correspond to operation contents defined by selective operation of said operating unit by the player;
   action control means for reading from said action storing means the selected action contents according to the instructions from said operating unit, and causing the play character to perform said selected action contents;

batting instructing means for instructing a selected one of the play characters which is a batter by use of batting instruction contents defined by player operation of said batting instructing means;

batting judging means for judging batting results in terms of at least one of hit ball direction and batting point and defining batting judging contents corresponding thereto, judging of said batting results being based on the batting instruction contents and said selected action contents;

batting storing means for storing said batting judgment contents; and batting record display means for displaying batting records, said batting record display means including:
batting statistics processing means for performing statistics processing on said batting judgement contents; and
batting figures display control means for performing screen control such that the batting judgement contents subjected to said statistics processing are displayed all at once on said display unit following an end of play.

25. A video game device according to claim 24, wherein said operating unit includes said batting instructing means.

26. A video game device according to claim 24, wherein said batting instructing contents includes batting position data and batting timing data.

27. A video game device according to claim 24, wherein said batting instructing contents further includes hard swing data.

28. A video game device according to claim 24, wherein said batting judging means comprises a batting/no-batting judging means for judging whether or not the bat on the screen hit the ball, based on batting position data and batting timing data of said batting instruction contents, and on pitching data of the instruction results of said action contents.

29. A video game device according to claim 28, wherein said batting judging means comprises a hit ball speed computing means for computing the speed of a hit ball based on the batting position data, batting timing data, and hard swing data of said batting instruction contents, and on the batter power data of the instruction results of said action contents, in the event that judgement has been made by said batting/no-batting judging means that the bat on the screen has hit the ball.

30. A video game device according to claim 29, wherein said batting judging means comprises a hit ball horizontal angle computing means for computing the horizontal angle of a hit ball on the screen, based on the batting position data of said batting instruction contents, and on the pitching data of the instruction results of said action contents, in the event that judgement has been made by said batting/no-batting judging means that the bat on the screen has hit the ball.

31. A video game device according to claim 28, wherein said batting judging means comprises:
a special capability storing means for storing special capabilities of batters; and
a hit ball vertical angle computing means for computing the vertical angle of a hit ball on the screen, based on the batting position data and hard swing data of said batting instruction contents, and on said special capabilities, in the event that judgement has been made by said batting/no-batting judging means that the bat on the screen has hit the ball.

* * * * *